US008468449B1

(12) United States Patent
Hall (10) Patent No.: US 8,468,449 B1
(45) Date of Patent: Jun. 18, 2013

(54) GENERATING CSS SHORTHAND PROPERTIES

(75) Inventor: Matthew T. Hall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 47 days.

(21) Appl. No.: 13/314,204

(22) Filed: Dec. 8, 2011

(51) Int. Cl.
*G06F 17/00* (2006.01)

(52) U.S. Cl.
USPC .......................................... 715/273

(58) Field of Classification Search
USPC .................. 715/234, 235, 236, 237, 239, 241
See application file for complete search history.

(56) References Cited

U.S. PATENT DOCUMENTS

| | | | |
|---|---|---|---|
| 6,613,098 B1 * | 9/2003 | Sorge et al. ................... | 715/234 |
| 7,249,318 B1 * | 7/2007 | Corell et al. ................... | 715/209 |
| 7,490,290 B2 | 2/2009 | White et al. | |
| 7,716,574 B2 | 5/2010 | Chartier et al. | |
| 7,802,182 B2 | 9/2010 | Bales | |
| 7,996,765 B1 | 8/2011 | Mitnick et al. | |
| 8,181,107 B2 * | 5/2012 | Melnyk et al. ................ | 715/238 |
| 8,200,700 B2 * | 6/2012 | Moore et al. .................. | 707/791 |
| 2003/0195885 A1 * | 10/2003 | Emmick et al. .................. | 707/8 |
| 2004/0237040 A1 * | 11/2004 | Malkin et al. ................. | 715/526 |
| 2006/0218490 A1 | 9/2006 | Fink | |
| 2007/0113188 A1 * | 5/2007 | Bales et al. ................... | 715/742 |
| 2008/0140766 A1 | 6/2008 | Mohan | |
| 2009/0019064 A1 * | 1/2009 | Takafuji ........................ | 707/100 |
| 2009/0112824 A1 * | 4/2009 | Fu et al. ............................ | 707/3 |
| 2009/0228782 A1 * | 9/2009 | Fraser ........................... | 715/234 |
| 2009/0276764 A1 * | 11/2009 | Ghorbani et al. .............. | 717/148 |
| 2010/0205541 A1 * | 8/2010 | Rapaport et al. .............. | 715/753 |
| 2010/0268773 A1 * | 10/2010 | Hunt et al. ..................... | 709/203 |
| 2010/0332993 A1 * | 12/2010 | Bousseton et al. ............ | 715/738 |

OTHER PUBLICATIONS

Quint, et al., "Editing with Style", Retrieved at <<http://wam.inrialpes.fr/publications/2007/DocEng2007/fp08-quint.pdf>>, ACM symposium on Document engineering (DocEng), Aug. 28-31, 2007, pp. 151-160.
"Understanding Cascading Style Sheets", Retrieved at <<http://help.adobe.com/en_US/dreamweaver/cs/using/WScbb6b82af5544594822510a94ae8d65-7e31a.html#WScbb6b82af5544594822510a94ae8d65-7e>>, Retrieved Date: Sep. 13, 2011, pp. 6.

* cited by examiner

*Primary Examiner* — Laurie Ries (57) ABSTRACT

An authoring tool for CSS retains original user syntax and generates CSS markup that minimizes a total number of properties in the markup. A directed graph is generated from the original user markup. Nodes in the graph can be collapsed and expanded to convert between longhand and shorthand properties. User input updating property values can result in the generation of compact CSS code that retains syntactical features of the original user syntax.

20 Claims, 6 Drawing Sheets

GENERATING CSS SHORTHAND PROPERTIES

BACKGROUND

Cascading Style Sheets (CSS) refers to formatting rules developed by the W3C (World Wide Web Consortium) for web page content. The word "cascading" refers to the way CSS determines how a particular element is ultimately displayed in the web page. The style (color, font and spacing) in which the element is displayed is affected by the style sheet created by the author of the page, by the user's customized style selections (if any), by the default styles of the browser that displays the page, by CSS specificity (a methodology that gives different weight to particular kinds of CSS rules), and by the order of CSS rules, creating a complex "cascade" of potentially conflicting rules in which determinations that have higher priority override those with lower priorities.

CSS separates content (e.g., HTML code) from the CSS rules that define how the content looks (referred to as "the presentation" of the content). HTML code resides in an HTML file and the CSS rules that define how the content looks reside in an external style sheet file with a .css extension or in a particular part of an HTML document. In addition to controlling the appearance of text on the web site, CSS can be used to control the format and positioning of block-level elements. Block-level elements are produced by using tags such as the h1, p and div tags to delimit blocks of content that are treated as a single element.

A CSS formatting rule is composed of a selector and the declaration or block of declarations. The selector can be a tag such as h1, p, a class name or an identifier that identifies the formatted element. The declaration block defines the style properties to be applied to the indicated content. For example, in the following rule:

p {
font-size: 12 pt;
font-family: Arial;
font-weight: bold;
} selector p indicates that the content of a paragraph will be displayed in a 12 point bold Arial font. The font-size, font-family and font-weight tags denote properties of the paragraph content and 12 points, Arial and bold are values of the respective properties. Because one rule can apply to many tags (e.g., in the example rule above, the rule can apply to the content of many different paragraphs), changing the appearance of all the block elements using the same rule can be effected by changing a single rule.

CSS statements can specify a value for each separate property explicitly in a longhand declaration for that particular property. CSS also allows for the creation of shorthand declarations, an abbreviated way to specify the values of several properties using a single declaration, by using shorthand property names. The use of shorthand property names has the effect of combining several associated properties into a single declaration by replacing all the individual property names with the shorthand property name. The values for the properties can be specified in a comma separated list. For example, the border property is a conceptual perimeter line around an element, between the inner padding and outer margin space. The border keyword is a shorthand property name composed of a border-style property, border-width property and border-color property. Each of these properties can be set individually. Each of these properties can be set for the top, right, bottom and left side of the element. A shorthand definition of the border property can omit values for some of the properties that make up the shorthand property. Shorthand CSS rules assign default values to omitted property values.

SUMMARY

An authoring tool can convert between longhand and shorthand CSS properties. CSS properties can be edited in a code editor or in a more graphical form such as a property grid. Existing CSS syntax and placement of CSS statements can be preserved. Conversion between longhand and shorthand properties can be implemented by creating a directed graph and walking nodes within the directed graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Web authors are often particular about how their markup code looks. Typically, web authors prefer to minimize the amount of CSS code they produce. They often have individual preferences with respect to code placement and other conventions (such as but not limited to capitalization preferences). Known web page authoring tools can change the appearance of a web author's code when the code is changed. Authoring tools that are presently available produce wordy syntax and do not reliably maintain the existing syntax and code placement. In accordance with aspects of the subject matter disclosed herein an authoring tool generates compact CSS syntax that preserves as much of the existing syntax as possible by expanding and contracting portions of a directed graph built from a group of CSS statements based on walking the nodes of a second directed graph built from features of the CSS language. The directed graph created based on the features of the CSS language acts as a template, as described more fully below.

A CSS property is a semantic entity which determines how CSS styles an HTML element. A CSS property declaration is a syntactical construct which allows an author to specify the values of CSS properties within CSS markup. CSS properties can also be specified in non-declarative ways that do not use CSS property declarations, such as for example, by calling APIs (Application Programming Interfaces) within a DOM (Document Object Model). There is often a direct 1:1 correspondence between CSS properties and CSS property declarations. A 1:1 correspondence between CSS properties and CSS property declarations exists for a longhand CSS statement. Known authoring tools can display and update the values of longhand CSS properties by finding a CSS property declaration with the same name as the CSS property and honoring rules about ordering. Shorthand CSS property declarations sever the 1:1 relationship between properties and their declarations. When the 1:1 correspondence does not exist, known authoring tools can still determine the value of a CSS property but are not able to allow a user to change the values of CSS properties while outputting CSS syntax with CSS shorthand property declarations that follow the existing pattern in the CSS created by a user.

In accordance with aspects of the subject matter disclosed herein, the grammar of CSS property declarations is modeled as a directed graph. The directed graph can exist independently of any actual CSS markup. That is, the directed graph can apply statically to the grammar of CSS itself, instead of applying to any particular string within the CSS grammar. Such a graph is illustrated in FIG. 1b which shows the directed graph for the border property 152, having components width 154, style 156 and color 158. The width 154 component of the border property 152 points to the border-width property 160. The border-width property 160 has components top 162, right 164, bottom 166 and left 168 that point respectively to the border-top-width property 170, border-right-width property 172 and so on. The edges described are all outgoing edges but it will be appreciated that for each outgoing edge an incoming edge also exists. For example, the width 154 component of the border property 152 has an incoming edge from border-width property 160 and so on.

Figure 1A:
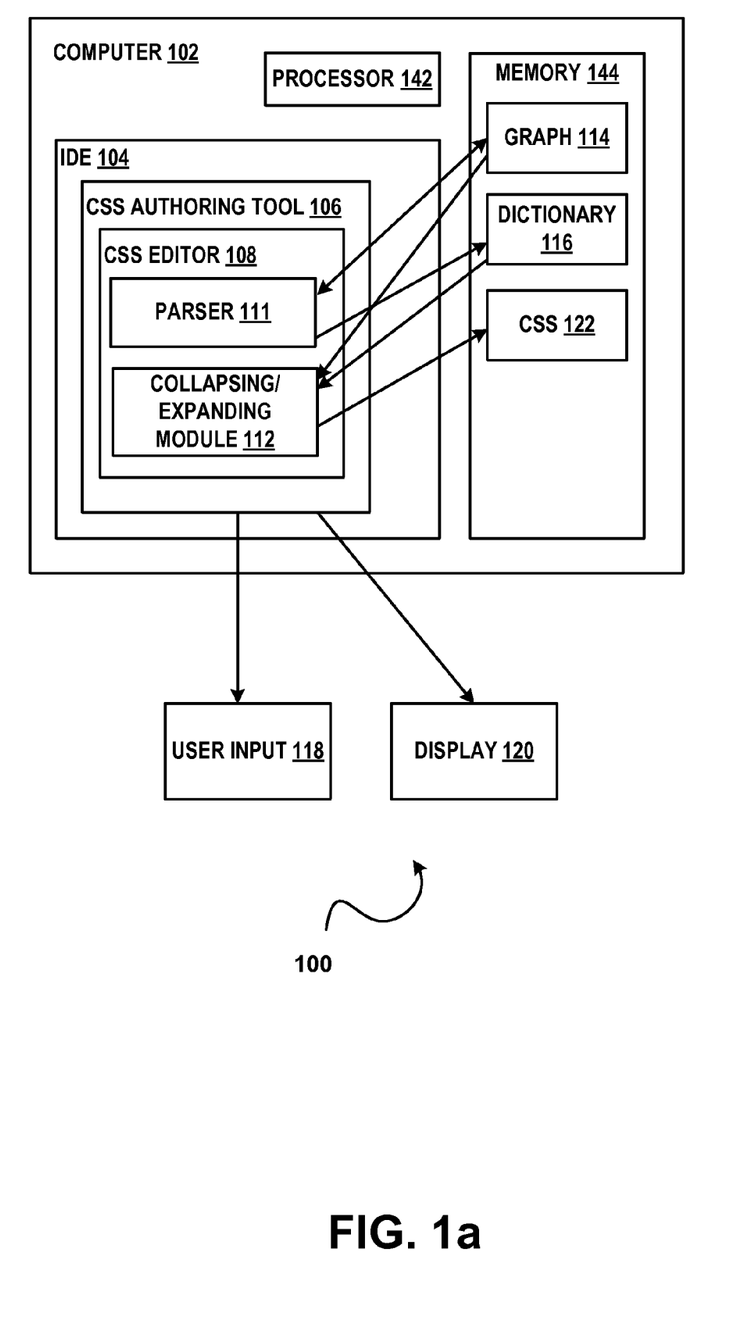
FIG. 1a illustrates an example of a system 100 that converts between longhand and shorthand CSS properties in accordance with aspects of the subject matter disclosed herein.
Figure 1B:
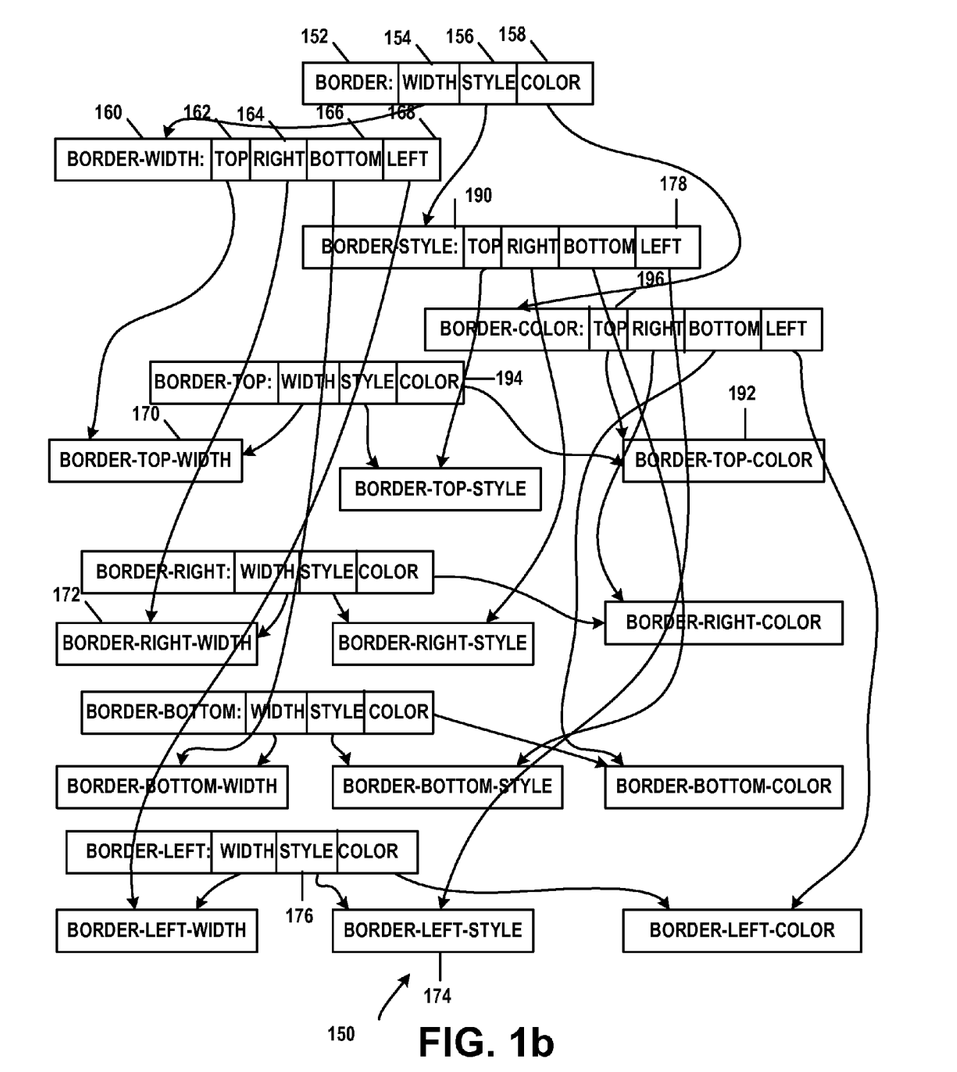
FIG. 1b illustrates an example of a directed graph 150 based on features of CSS in accordance with aspects of the subject matter disclosed herein.
Figure 1C:
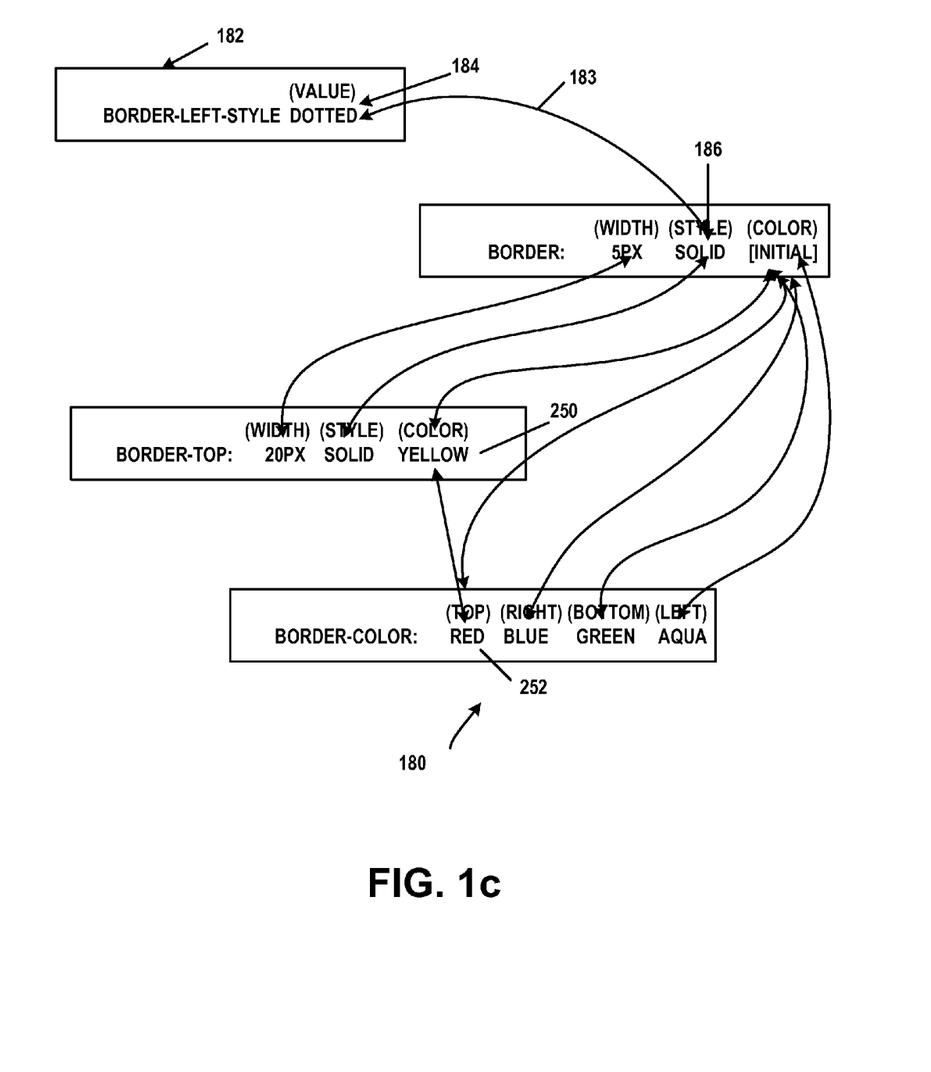
FIG. 1c illustrates an example of a directed graph 180 created for a section of markup in accordance with aspects of the subject matter disclosed herein.

FIG. 1c illustrates an example of a directed graph 180 created for the markup:
element {
border: 5px solid;
border-color: red blue green aqua !important;
border-top: 20px solid yellow:
border-left-style: dotted;
}
The arrows in directed graph 180 show pieces of text that are connected by edges. For example, in directed graph 180, border-left-style 182 has a value "dotted" (value 184). Border-left-style 182 is connected by an edge 183 to the style component of border, style 186. The value ("solid") of the style component of border, style 186 conflicts with the value of border-left-style 182 "dotted". To determine which value takes precedence, the template (e.g., FIG. 1b) is examined to determine all the possible incoming edges for border-left-style. The incoming edges for border-left-style 174 are border-left.style 176, border-style.left 178 and because border-style 190 has an incoming edge from the style component of the border property, style 156, border-left-style 174 has an indirect incoming edge from the style component of the border property, style 156. Because the border-left-style: dotted statement comes later in the markup, the style of the left border will be dotted.

Similarly, to determine the color of the top border, three possible incoming edges for border-top-color 192 are border-top.color 194, border-color.top 196 and indirectly border.color 158. In the directed graph 180 for the markup, the value for border-top.color (which is yellow) 250 conflicts with the value for border-color.top (which is red) 252. The top border will be red because of the !important indicator in the border-color: red blue green aqua !important; line. This property group cannot be collapsed because all the sides of the border are not the same color and because border-color has an !important indicator attached and the other properties in the property group do not have an !important indicator.

The directed graph can include internal and external nodes where internal and external nodes can represent shorthand or terminal property components and/or shorthand or terminal CSS properties. A terminal property is a property defined using CSS where the definition does not include any symbols that can be replaced by other properties. A shorthand property is a property defined using CSS whose definition includes one or more symbols that can be replaced by other properties. A shorthand property component is a non-terminal symbol within the definition of a shorthand property which can be replaced by other properties. Thus a parent property is a shorthand property.

For example, consider a property named "width", labeled here for clarity as [width], and a property component named "width", a component of a property named "border", labeled here as [border].[width]. Edges in the graph originate from shorthand property components and point towards other CSS properties. An outgoing edge therefore can indicate that a shorthand property component can specify the value of the CSS properties to which a path exists in the graph. Hence, a shorthand property can be viewed as any property including a component with outgoing edges, while a terminal property is any property without any outgoing edges. All terminal properties can have a single component named [value], but instead of pointing to another property declaration in the grammar, each terminal property can instead have an outgoing edge to the semantic property with the same name as its parent terminal property.

The directed graphs described above can be used to determine the value of a CSS property as defined in a group of CSS statements. A dictionary implemented by walking the nodes of the directed graph created from the grammar of the CSS property declarations and extracting values from the group of CSS statements can map labeled nodes within the graph to the syntactical values that are associated with the nodes in the markup. For example, the CSS statements:
body
{
outline: 4px solid red;
margin: 1px 2px 3px 4px;
width: 10px;
}
results in a mapping of component name [outline].[width] to the syntactical value 4px. Component [outline].[style] is mapped to the syntactical value solid. Component [outline].[color] is mapped to the syntactical value red. Component [margin].[top] is mapped to the syntactical value 1px. Component [margin].[right] is mapped to the syntactical value 2px. Component [margin].[bottom] is mapped to the syntactical value 3px. Component [margin].[left] is mapped to the syntactical value 4px. Component [width].[value] is mapped to the syntactical value 10px. It will be appreciated there no direct 1:1 correspondence between property components and the syntax used to create the mappings in the dictionary.

The CSS statements:
body
{
outline: 4px solid;
margin: 1px;
} results in a mapping of component name [outline].[width] to the syntactical value 4px. Component [outline].[style] is mapped to the syntactical value solid. Component [outline].[color] is mapped to the syntactical value initial. Component [margin].[top] is mapped to the syntactical value 1px. Component [margin].[right] is mapped to the syntactical value 1px. Component [margin].[bottom] is mapped to the syntactical value 1px. Component [margin].[left] is mapped to the syntactical value 1px. Component [width] [value] is mapped to the syntactical value 10px. It will be appreciated that the value of [outline].[color] does not appear in the markup. Its value is implied by the rules of CSS. Similarly, the values of the margin components other than [top] do not appear in markup—instead their values are made equal to the value for [margin].[top], in accordance with the rules of CSS.

A parser capable of understanding the grammar of CSS can be used to create a dictionary. The parser can also understand the semantics implied by the grammar, so that missing values, values for nodes in the directed graph for which a literal representation in the markup is not found, can be filled in. The dictionary can be examined to find entries within it for all nodes within the graph from which a path exists to the semantic property in question. For example, suppose the value of the semantic "margin-left" property is desired. Two nodes in the graph: [margin-left].[value] and [margin].[left] can be examined. The [margin-left].[value] node has an outgoing edge in the graph to the [margin].[left] node. If neither node exists in the dictionary, the property is unspecified in the markup. If neither node exists in the dictionary, the value of the node which conies last in the markup (or the one which has an !important keyword specified for it and which comes last in markup is used to determine the value, thereby determining the value of the semantic shorthand property.

The CSS graph can be comprised primarily of terminal property nodes with out any incoming edges. A shorthand property group is a subgraph of connected nodes within the larger graph comprising shorthand properties which may or may not have incoming edges, along with terminal properties which have at least one (but may have more) incoming edges originating from the components of these shorthand properties. Terminal properties without any incoming edges are not a part of any shorthand property group.

In accordance with aspects of the subject matter disclosed herein, to set the value of a semantic property, the shorthand property group to which a terminal property belongs is determined. If the terminal property does not belong to a shorthand group, a 1:1 mapping between semantic properties and syntactical property declarations exists and the last declaration whose name matches the semantic property is selected. If no declaration is found for the matching property, a new declaration can be created.

The directed graph representing a shorthand property group can include multiple nodes that point to the same terminal node. In accordance with aspects of the subject matter disclosed herein, the node that minimizes the number of property declarations needed to simultaneously specify all of the semantic properties within the shorthand group specified by the style declaration is selected.

A set of terminal properties can be collapsed into a shorthand property if all of the following conditions are met:
1. All of the terminal properties to which the shorthand property has outgoing edges are specified within the CSS markup. Because a shorthand property specifies a value for all of its constituent terminals, a shorthand notation cannot be used if one of the terminals of the shorthand notation is unspecified, although a terminal value can be specified by the implicit initial value implied by a missing component.
2. The importance of all the terminals match. The "!important" syntax can be applied to a shorthand property as a whole. It cannot be applied to a subset of the components of the shorthand property.
3. All the terminals of the shorthand property are specified as inherit, or none of the terminals of the shorthand property are specified as inherit. A shorthand property declaration that is specified as inherit creates the implication that its constituent terminals have the same value.
4. All the terminals of the shorthand property are specified as initial, or none of the terminals of the shorthand property are specified as initial. The shorthand property allows for implicit initial specification of values using a syntax which omits the component in question (i.e. [outline].[border], etc.)
5. The specified values are the same for all the terminals of each component of the shorthand property having outgoing edges within the graph to more than one terminal property.

The conditions described above can be implemented using the lookup dictionary by:
1. Finding all terminal properties to which the shorthand property has an outgoing edge in the graph (either directly or through a larger path). If any of these nodes are not present in the lookup dictionary the shorthand property cannot be collapsed.
2. The specified value and the importance of the property within which the terminal property is specified is stored in the lookup dictionary. If the importances of the terminal properties do not agree, the shorthand property cannot be collapsed. If the importances of the terminal properties agree, the shorthand property can be collapsed. The importance of the shorthand property declaration generated is set to the importance shared by the terminals.
3. If the values of all of the terminals in the lookup dictionary for inherit do not match, the shorthand property cannot be collapsed. If the inherit values agree, the shorthand property can be collapsed.
4. If the values of all of the terminals in the lookup dictionary for initial do not match, the shorthand property cannot be collapsed. If the initial values agree, the shorthand property can be collapsed.
5. For each component of the shorthand property, the paths in the graph along its outgoing edges can be walked to find all the terminal properties specified by the component. If the values of the terminal properties do not agree, the shorthand property cannot be collapsed. If the values of agree the shorthand property is collapsed to the value shared by all of the terminals.

Some shorthand groups include more than one shorthand property within the group. A path exists within the directed graph between a shorthand collapse group and every shorthand property within the parent shorthand group. The set of terminal properties specified by each shorthand property within the shorthand collapse group is disjoint. Thus while there is a path from the shorthand collapse group to every shorthand property, there is only a single path for each terminal property.

The list of shorthand collapse groups within each shorthand group can be computed by walking the graph and grouping together the disjoint shorthand properties. Each shorthand collapse group can be assigned a theoretical minimum score comprising the number of shorthand properties within the collapse group, representing the case in which each of the shorthand properties in the group can be collapsed. The list of collapse groups can be iterated over in ascending order of their minimum scores. An attempt can be made to attempt to collapse each shorthand property within each collapse group. Because each shorthand property is disjoint in the terminals that it specifies, the order in which the attempt to collapse properties within the collapse group is immaterial. The number of properties to which a particular shorthand group can be collapsed to is determined, ranging between 0 and N, where N is the total number of terminals specified by the shorthand.

That is, 0 represents the case in which of the shorthand's constituent terminals have a specified value. 1 represents the case in which all of the constituent terminals are specified and they are collapsible to the shorthand using the process described above, N represents the case in which all of the constituent terminals are specified, but they are not collapsible to the shorthand. In this case the shorthand can be expanded out to the terminal properties. Other values n can represent that n terminals are specified. In this case the shorthand can be expanded out for the n terminal properties. The total number of property declarations that each of the shorthand properties within the collapse group collapse to can be summed. If the sum is less than the theoretical minimum of the next shorthand collapse group in the list, the most compact format possible has been found. Otherwise, the current result can be saved and the next group can be processed. These acts can be repeated until the iteration that generates the fewest property declarations is found.

To edit CSS properties preserving existing CSS syntax and placement of CSS statements, a dictionary mapping can be built between nodes in the graph to the values specified in the markup. The graph can include nodes whose value is checked for equality against other values, regardless of syntax (needed to generate the most compact CSS output), and the actual syntactical representation of the value in markup, the importance of the parent property within which the value is currently specified. When a new value is set for a semantic terminal property the existing value for the terminal property can be accessed in the dictionary. If the terminal property is not found in the dictionary and the user wants to "clear" or "unset" the value, no action is taken because the terminal property already has the requested value. If the new value matches the existing value, no action is taken because the terminal property already has the requested value. Otherwise the terminal property's value in the dictionary can be updated in accordance with user input.

A list of new property declarations and their values can be created from the dictionary. Because the actual syntactical representation of these values is stored in the directed graph, when a shorthand property is expanded, values can be copied from other components of the shorthand property using the existing syntactical representation. The list of property declarations in the parent style declaration can be iterated through to build a dictionary mapping existing property declaration names to their corresponding property declarations. The last property declaration within the style declaration which is a member of the shorthand group for the terminal property that is being updated can be stored. The list of new property declarations can be iterated through to write them out. The order in which the property declarations are added to the style declaration is immaterial because the declarations generated are optimal and will have the same semantic effect enabling preservation and ordering of the existing syntax as follows. When a new properly declaration is created, the dictionary can be examined. If an existing property declaration with the same name as the new one exists, the declaration can be updated in place to match the new version of the declaration. Only the nodes that have changed will need to be updated, thereby preserving both the syntax and the ordering of the property declaration within its parent style declaration.

If an existing property declaration with the same name as the new one does not exist, a new declaration can be created and can be added to the parent style declaration. Because most web authors place similar properties near each other in a style declaration, instead of adding the created property declaration to the end of the style declaration, it can be added after the last property declaration from the shorthand group, and the last property declaration can be updated to the created property declaration. All the property declarations in the style declaration can be iterated over again. If the property declaration is a member of the current shorthand group, and is not a property declaration that was updated or created, then this is an outdated property declaration can be removed it from the style declaration.

Generating CSS Shorthand Properties

FIG. 1a illustrates an example of a system 100 that generates CSS shorthand properties in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 or portions thereof may execute within an integrated development environment (IDE) such as IDE 104 or may execute outside of an IDE. The IDE can be an IDE such as the one described with respect to FIG. 4 or can be any other IDE that supports a native language. All or portions of system 100 may be implemented as a plug-in or add-on.

System 100 may include one or more computers or computing devices such as a computer 102 comprising: one or more processors such as processor 142, etc., a memory such as memory 144, and a CSS authoring tool such as CSS authoring tool 106. The CSS authoring tool can comprise a CSS editor such as CSS editor 108. CSS Editor 108 can comprise any combination of: one or more program modules or components such as graph builder or parser 111, and/or collapsing/expanding module 112. System 100 may also include other components (not shown) known in the arts. The CSS authoring tool 106 can receive user input such as user input 118. The CSS authoring tool can display output such as display 120. The CSS authoring tool 106 can received or can create one or more directed graphs such as directed graph 114 that are based on features of CSS rather than on any particular piece of markup code. The CSS authoring tool 106 can create and/or modify a dictionary 116 implemented as a directed graph created from a particular piece of markup. The CSS authoring tool can generate CSS code such as CSS code 122.

The CSS authoring tool such as CSS authoring tool 106 can receive user input 118. User input 118 can comprise markup code such as CSS markup or a combination of HTML code and CSS markup. The CSS code can comprise one or more CSS statements that specify CSS properties and their values. CSS statements can include longhand property declarations. CSS statements can include shorthand property declarations.

The grammar of CSS property declarations can be modeled as a directed graph such as graph 114 by parser 111. The directed graph can include internal and external nodes where internal and external nodes can represent shorthand or terminal property components and/or shorthand or terminal CSS properties.

The parser can be capable of understanding the grammar of CSS. The parser can be used to create a dictionary such as dictionary 115 from the directed graph for a particular portion of CSS markup. The parser can also understand the semantics implied by the grammar, so that missing values of nodes in the graph can be determined. The dictionary can be examined to find entries within it for all nodes within the graph from which a path exists to the specified semantic property. The updated graph can be used to determine the value of a CSS property.

The dictionary can map labeled nodes within the graph to the syntactical values that correspond to the nodes in the CSS markup.

The dictionary can map nodes in the graph to their specified values in the CSS markup. Values in the dictionary can be used to check for equality against other values, regardless of the syntax of the user input. Equality information is needed by the collapsing/expanding module 112 to determine if a longhand property declaration can be collapsed to a shorthand property declaration. The dictionary can include the actual syntactical representation of the value in the user input (e.g., CSS markup). The dictionary can include the importance of the property within which the value is currently specified in the received CSS markup.

A collapsing/expanding module such as collapsing/expanding module 112 can convert between longhand and shorthand properties. The collapsing/expanding module can expand shorthand properties to longhand properties and can collapse longhand properties to shorthand properties as described more fully above.

Figure 2:
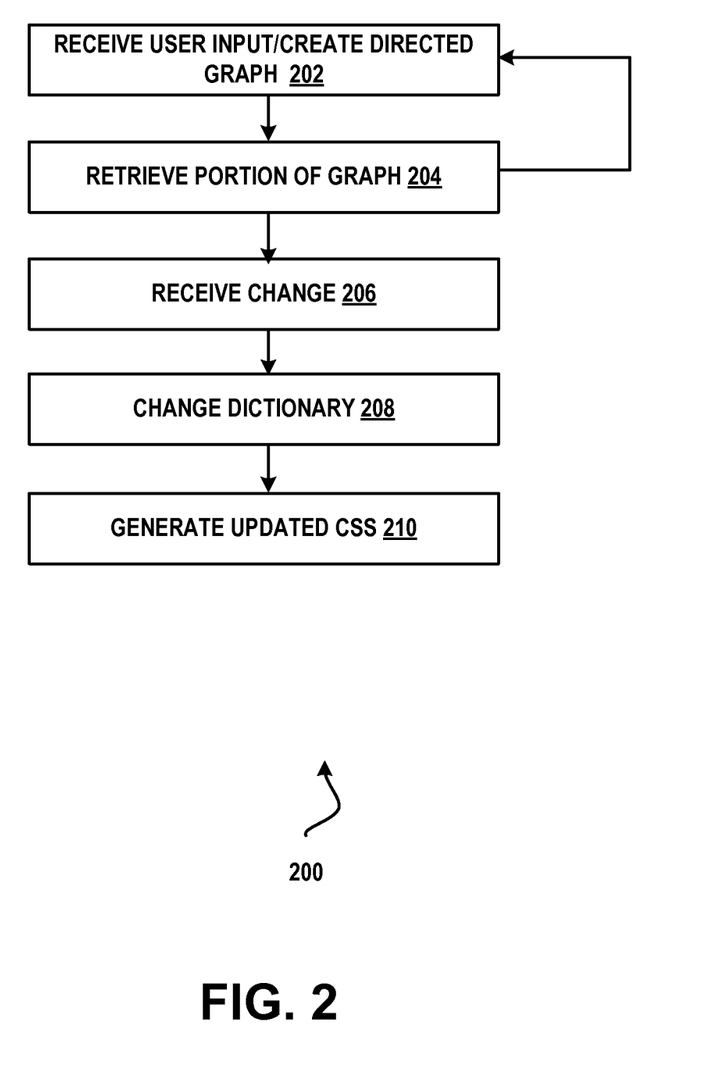
FIG. 2 illustrates an example of a method 200 that converts between longhand and shorthand CSS properties in accordance with aspects of the subject matter disclosed herein.

FIG. 2 illustrates a method 200 that can determine the values of shorthand properties and can edit CSS markup to create CSS markup that preserves existing syntax and minimizes a total number of properties in accordance with aspects of the subject matter disclosed herein. The method described in FIG. 2 can be practiced by a system such as but not limited to the one described with respect to FIG. 1a. While method 200 describes a series of acts that are performed in a sequence, it is to be understood that method 200 is not limited by the order of the sequence. For instance, some acts may occur in a different order than that described. In addition, an act may occur concurrently with another act. In some instances, not all acts may be performed.

Method 200 can include creation of the directed graph templates for the features of CSS. Alternatively, the templates may already exist and can be received by the CSS authoring tool. At 202 user input comprising CSS markup can be parsed to create a directed graph for the CSS markup. At 204 a portion of the directed graph can be retrieved, the portion of the directed graph specifying a longhand property value. At 206 user input specifying a change to the existing CSS markup can be received. At 208 the directed graph representing the markup can be changed by changing the values for properties in accordance with the user input and collapsing the portions of the graph that can be collapsed as described more hilly above. At 210 the updated markup can be generated, as described more fully above.

Example of a Suitable Computing Environment

Figure 3:
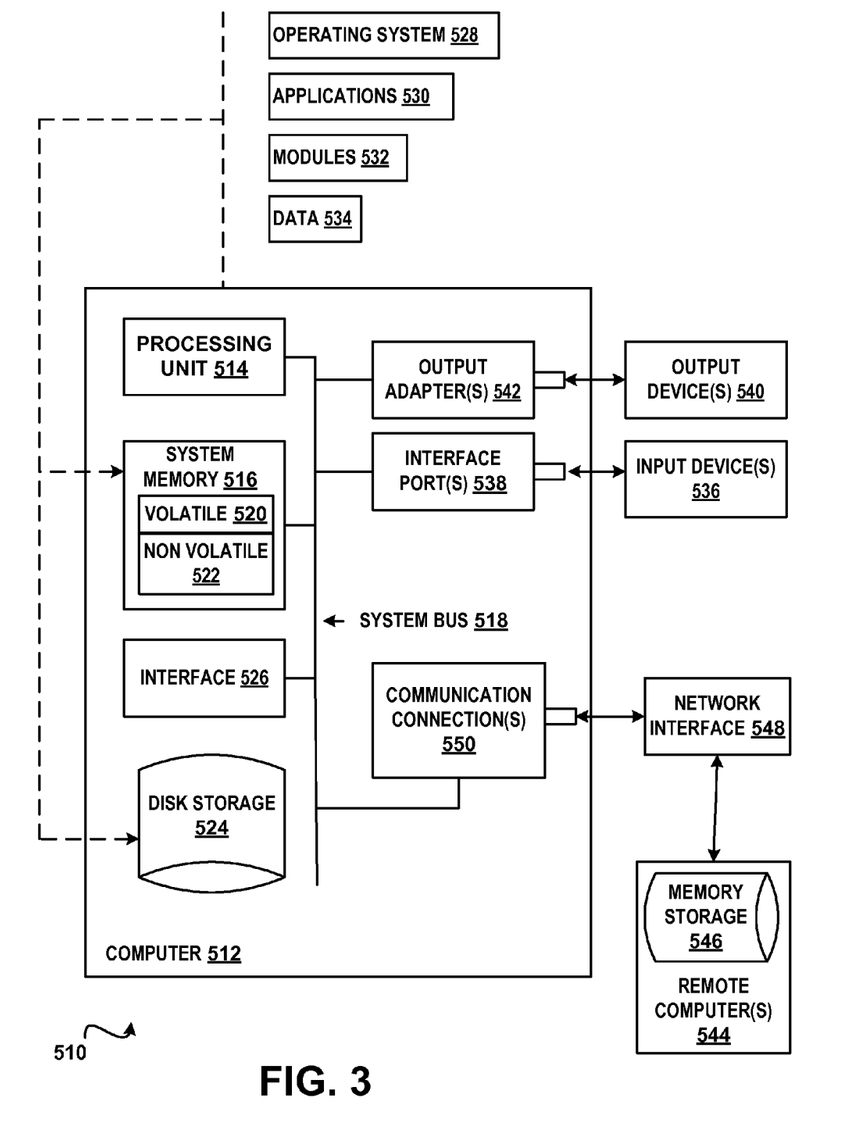
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a GPU. The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
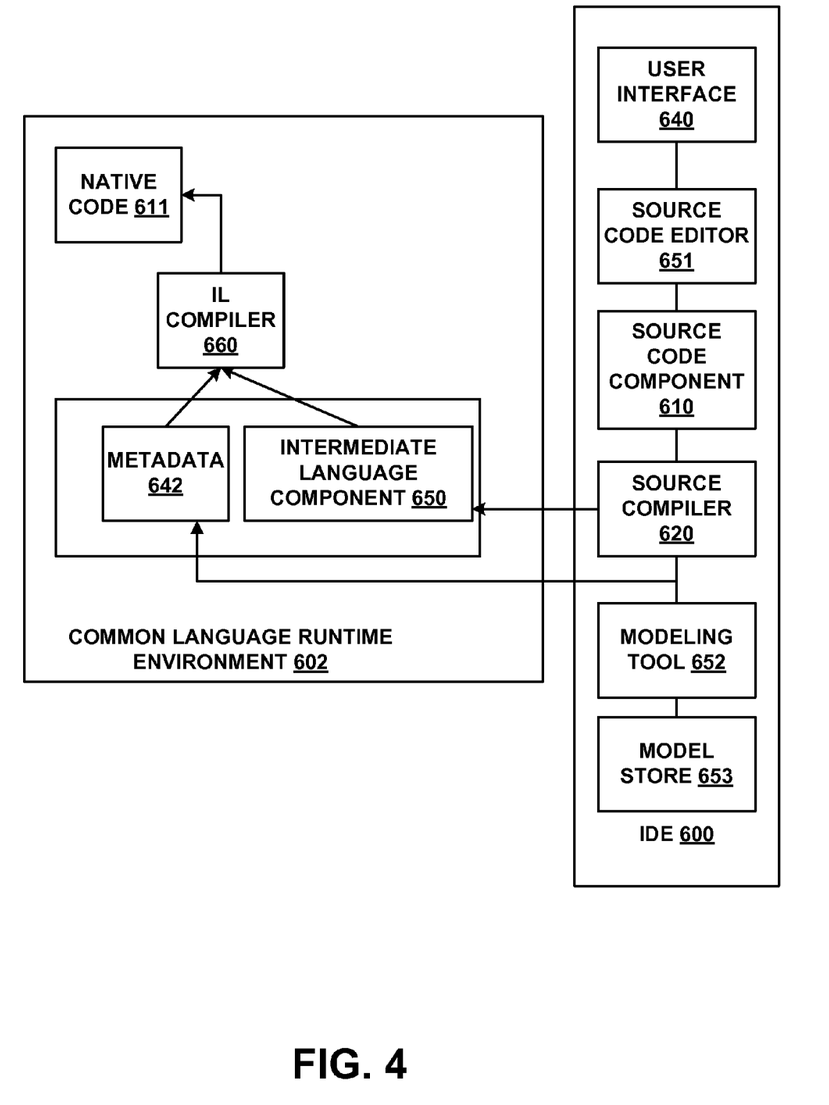
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like), The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system comprising:
at least one processor of a computing device;
a memory of the computing device; and
at least one module loaded into the memory causing the at least one processor to:
receive CSS input;
generate a directed graph in memory from the CSS input;
receive user input changing at least one CSS statement in the CSS input;
modify the directed graph in memory to reflect the user input changing the at least one CSS statement;

convert between longhand and shorthand CSS properties by walking nodes in the modified directed graph;
generate CSS output, the CSS output minimizing a total number of properties in the generated CSS output.

2. The system of claim 1, further comprising:
at least one module loaded into the memory causing the at least one processor to:
use a node in the directed graph that minimizes property declarations specifying semantic properties within a shorthand group, the shorthand group comprising a subgraph of connected nodes in the directed graph comprising shorthand properties and terminal properties having at least one incoming edge originating from components of the shorthand properties.

3. The system of claim 1, further comprising:
at least one module loaded into the memory causing the at least one processor to:
collapse a set of terminal properties into a shorthand property in response to determining that specified values for all terminal properties in the set of terminal properties of each component of the shorthand property having outgoing edges within the directed graph comply with a set of collapsing rules.

4. The system of claim 3, wherein the set of collapsing rules comprise:
in response to determining that:
all the terminal properties to which the shorthand property has outgoing edges are specified within the group of CSS statements;
the importance of all the terminal properties for the collapse group match;
all the terminal properties or none of the terminal properties for the collapse group have a value of "inherit";
all the terminal properties or none of the terminal properties for the collapse group have a value of "initial";
all the terminal properties for the collapse group have an identical value;
collapsing the set of terminal properties into a shorthand property.

5. The system of claim 4, further comprising:
at least one module loaded into the memory causing the at least one processor to:
select a compact syntactical format for a group of CSS statements by selecting shorthand properties generated by a collapse group having a fewest number of property declarations, wherein a collapse group comprises a group of property declarations that can be specified in a single property declaration.

6. The system of claim 5, further comprising:
at least one module loaded into the memory causing the at least one processor to:
preserve existing CSS syntax in a group of CSS statements by adding nodes to the directed graph, the added nodes storing an actual syntactical representation of the CSS syntax in at least one CSS statement.

7. The system of claim 1, further comprising:
a directed graph comprising a template for collapsing properties into shorthand properties created from characteristics of the CSS rules.

8. A method of generating CSS markup comprising:
receiving at least one template for collapsing properties into shorthand properties, the at least one template comprising a directed graph created from characteristics of CSS language rules;
receiving by a processor of a computer, user input comprising CSS markup statements;
generating a directed graph from the received CSS markup statements;
receiving further user input changing at least one CSS markup statement in the received CSS markup statements;
in response to receiving the further user input, changing at least one node in the directed graph generated from the received CSS markup statements to create a modified direct graph;
converting between longhand and shorthand CSS properties in the CSS markup statements by walking nodes in the at least one template and extracting values from the directed graph generated from the received CSS markup statements;
generating at least one updated CSS markup statement, the at least one updated CSS markup statement minimizing a total number of properties appearing in the at least one updated CSS markup statement.

9. The method of claim 8, wherein the directed graph created from characteristics of CSS language rules comprises internal and external nodes, the internal and external nodes representing shorthand or terminal property components, a terminal property component comprising symbols that are not replaceable by other properties.

10. The method of claim 8, wherein the directed graph created from characteristics of CSS language rules comprises internal and external nodes, the internal and external nodes representing shorthand or terminal CSS properties, a terminal property comprising symbols that are not replaceable by other properties.

11. The method of claim 8, further comprising:
generating a compact CSS markup statement by selecting anode in the directed graph that minimizes property declarations specifying semantic properties within a shorthand group, the shorthand group comprising a subgraph of connected nodes in the directed graph, wherein the subgraph comprises shorthand properties and terminal properties having at least one incoming edge originating from components of the shorthand properties.

12. The method of claim 8, further comprising:
collapsing a set of terminal properties into a shorthand property in response to determining that specified values for all terminal properties in the set of terminal properties of each component of the shorthand property having outgoing edges within the directed graph to more than one terminal property are equal.

13. The method of claim 8, further comprising:
selecting a compact syntactical format for the CSS statement by computing a sum of property declarations that each of the shorthand properties within the a collapse group collapse to and selecting the property declaration for which the sum is less than a theoretical minimum for the shorthand collapse group.

14. The method of claim 8, further comprising:
building a dictionary mapping existing property declaration names to corresponding property declarations.

15. A computer-readable storage medium comprising computer-executable instructions which when executed cause at least one processor of a computing device to:
receive a first set of CSS statements;
generate a directed graph from the received first set of CSS statements, the directed graph comprising internal and external nodes, anode of the directed graph representing a shorthand property component, a terminal property component comprising symbols that are not replaceable by other symbols, a shorthand property or a terminal property comprising symbols that are not replaceable by other properties;

receive user input updating a value of a property in the received CSS statement;

convert between longhand and shorthand CSS properties in the CSS markup statements by walking nodes in at least one template comprising a directed graph created based on characteristics of CSS and extracting values from the directed graph generated from the received CSS markup statements;

generate an updated CSS statement that preserves syntax of the received CSS statement, the updated CSS statement minimizing a total number of properties appearing in the updated CSS statement.

16. The computer-readable storage medium of claim 15, comprising further computer-executable instructions, which when executed cause at least one processor to:

minimize the total number of properties in the updated CSS statement by selecting a node in the directed graph that minimizes property declarations specifying semantic properties within a shorthand group comprising a subgraph of connected nodes in the directed graph comprising shorthand properties and terminal properties having at least one incoming edge originating from components of the shorthand properties.

17. The computer-readable storage medium of claim 16, comprising further computer-executable instructions, which when executed cause at least one processor to:

select a compact syntactical format for the updated CSS statement by computing a sum of property declarations that each of the shorthand properties within the a collapse group collapse to and selecting the property declaration for which the sum is less than a theoretical minimum for the shorthand collapse group.

18. The computer-readable storage medium of claim 15, comprising further computer-executable instructions, which when executed cause at least one processor to:

collapse a set of terminal properties into a shorthand property in response to determining that specified values for all terminal properties in the set of terminal properties of each component of the shorthand property having outgoing edges within the directed graph to more than one terminal property are equal.

19. The computer-readable storage medium of claim 15, comprising further computer-executable instructions, which when executed cause at least one processor to:

preserve existing CSS syntax in the received CSS statement by adding nodes to the directed graph, the added nodes storing an actual syntactical representation of the CSS syntax in the received CSS statement.

20. The computer-readable storage medium of claim 19, comprising further computer-executable instructions, which when executed cause at least one processor to:

generate the updated CSS statement using the actual syntactical representation of the CSS syntax stored in the directed graph in the updated CSS statement.

\* \* \* \* \*